US010313553B2

(12) United States Patent
Nishijima (10) Patent No.: US 10,313,553 B2
(45) Date of Patent: Jun. 4, 2019

(54) IMAGE FORMING APPARATUS FOR PRINTING A BANNER PAGE USING DECOLORABLE OR NON-DECOLORABLE TONER

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takashi Nishijima, Numazu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/459,109

(22) Filed: Mar. 15, 2017

(65) Prior Publication Data

US 2018/0227459 A1 Aug. 9, 2018

(30) Foreign Application Priority Data

Feb. 3, 2017 (JP) .................................. 2017-018982

(51) Int. Cl.
| H04N 1/32 | (2006.01) |
| H04N 1/00 | (2006.01) |
| H04N 1/44 | (2006.01) |
| H04N 1/60 | (2006.01) |
| G03G 15/01 | (2006.01) |
| H04N 1/46 | (2006.01) |
| G03G 15/00 | (2006.01) |
| G03G 21/00 | (2006.01) |

(52) U.S. Cl.
CPC ..... *H04N 1/32112* (2013.01); *H04N 1/00222* (2013.01); *H04N 1/4446* (2013.01); *H04N 1/46* (2013.01); *H04N 1/6097* (2013.01); *G03G 15/6585* (2013.01); *G03G 21/00* (2013.01); *H04N 2201/0082* (2013.01); *H04N 2201/0094* (2013.01); *H04N 2201/3271* (2013.01)

(58) Field of Classification Search
None
See application file for complete search history.

(56) References Cited

U.S. PATENT DOCUMENTS

| 6,075,617 A * | 6/2000 | Fischer .................. G06K 15/02 358/1.13 |
| 6,227,531 B1 * | 5/2001 | Guerrero ................ B65H 33/04 270/1.01 |
| 8,599,446 B2 | 12/2013 | Akimoto et al. |

(Continued)

*Primary Examiner* — Thomas D Lee
(74) *Attorney, Agent, or Firm* — Amin, Turocy & Watson LLP (57) ABSTRACT

According to one embodiment, an image forming apparatus includes a banner page control unit, an image formation control unit, and a printer unit. The banner page control unit acquires banner page setting information indicating setting conditions of a banner page which is inserted between one sheet and another sheet, on which an image is formed by a plurality of jobs. The image formation control unit determines whether or not to form an image of the banner page by a printer unit, based on the banner page setting information. The printer unit forms the image of the banner page, if it is determined by the image formation control unit that the image of the banner page is formed.

6 Claims, 9 Drawing Sheets

(56) References Cited

U.S. PATENT DOCUMENTS

| | | | | |
|---|---|---|---|---|
| 2002/0075497 A1* | 6/2002 | Mantell | ................ | G06K 15/005 |
| | | | | 358/1.13 |
| 2003/0197320 A1* | 10/2003 | Hoblit | ................ | G03G 15/5087 |
| | | | | 270/1.01 |
| 2005/0122538 A1* | 6/2005 | Gauer | ................ | H04N 1/32101 |
| | | | | 358/1.15 |
| 2009/0040563 A1* | 2/2009 | Mestha | ................. | G03G 15/50 |
| | | | | 358/2.1 |
| 2011/0068532 A1* | 3/2011 | Berke | .................... | B65H 33/04 |
| | | | | 271/207 |
| 2011/0075208 A1* | 3/2011 | Ueda | ................. | H04N 1/00222 |
| | | | | 358/1.15 |
| 2016/0364635 A1* | 12/2016 | Namura | ............... | G06K 15/027 |

* cited by examiner

IMAGE FORMING APPARATUS FOR PRINTING A BANNER PAGE USING DECOLORABLE OR NON-DECOLORABLE TONER

CROSS-REFERENCE TO RELATED APPLICATIONS

This application is based upon and claims the benefit of priority from Japanese Patent Application No. 2017-018982, filed Feb. 3, 2017, the entire contents of which are incorporated herein by reference.

FIELD

Embodiments described herein relate generally to an image forming apparatus and an image forming method.

BACKGROUND

There is a case where a banner page or a cover is inserted into, for example, a head of each job or each copy as a partition of each job or each copy when image forming processing is performed. In addition, an image of predetermined information such as a user's name and a job name is formed in the banner page such that a user can distinguish the partition from a sheet on which an image is formed. However, if the image of the predetermined information such as a user's name and a job name is formed in the banner page, the user cannot reuse the banner page.

DETAILED DESCRIPTION

An object of an exemplary embodiment is to provide an image forming apparatus and an image forming method which can reuse a banner page.

In general, according to one embodiment, an image forming apparatus includes a banner page control unit, an image formation control unit, and a printer unit. The banner page control unit acquires banner page setting information indicating setting conditions of a banner page which is inserted between one sheet and another sheet, on which an image is formed by a plurality of jobs. The image formation control unit determines whether or not to form an image of the banner page by a printer unit, based on the banner page setting information. The printer unit forms the image of the banner page using decolorable developer, if it is determined by the image formation control unit that the image of the banner page is formed.

Hereinafter, an image forming apparatus and an image forming method according to an embodiment will be described with reference to the drawings.

Figure 1:
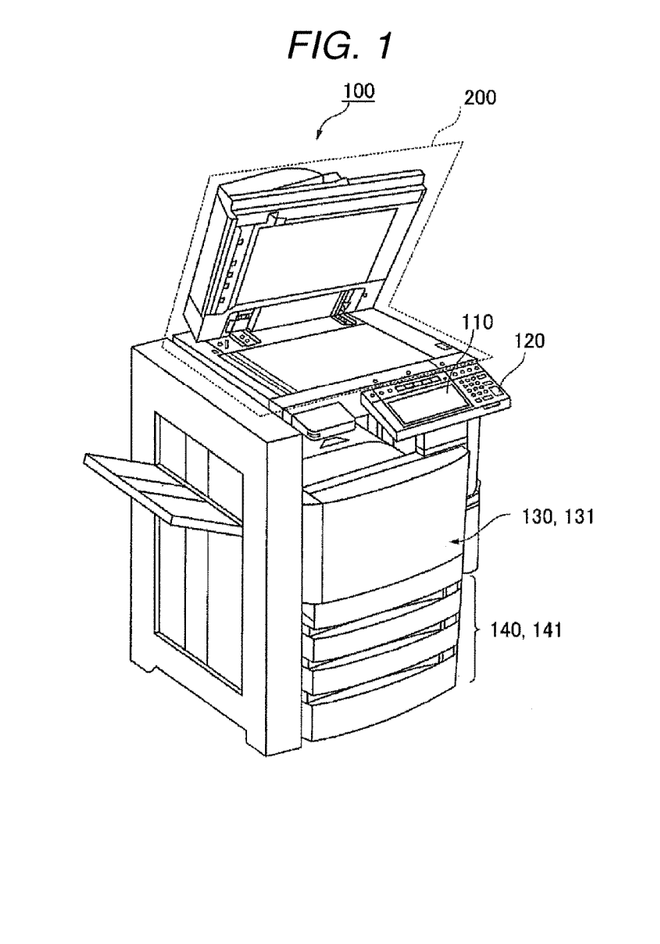
FIG. 1 is an external view illustrating an entire configuration example of an image forming apparatus according to an embodiment.

FIG. 1 is an external view illustrating an entire configuration example of an image forming apparatus 100 according to an embodiment. The image forming apparatus 100 is, for example, a complex machine. The image forming apparatus 100 includes a display 110, a control panel 120, a first printer unit 130, a second printer unit 131, a first sheet containing unit 140, a second sheet containing unit 141, and an image reading unit 200. The first printer unit 130 and the second printer unit 131 of the image forming apparatus 100 fix a toner image.

The image forming apparatus 100 forms an image on a sheet using developer such as toner. The toner includes non-decolorable toner that cannot be decolorized and decolorable toner which can be decolorized after an image is formed. Decolorable toner and non-decolorable toner which are disclosed in U.S. Pat. No. 9,134,668 and are known can be used as the toner. The sheet is, for example, paper or label paper. The sheet may be anything as long as the image forming apparatus 100 can form an image on a surface thereof.

The display 110 is an image displaying device such as a liquid crystal display or an organic electro luminescence (EL) display. The display 110 displays various types of information on the image forming apparatus 100.

The control panel 120 includes a plurality of buttons. The control panel 120 accepts an operation of a user. The control panel 120 outputs a signal according to an operation performed by the user to a control unit of the image forming apparatus 100. The display 110 and the control panel 120 may be configured as a touch panel of one piece.

The first printer unit 130 forms an image on a sheet, based on image information generated by the image reading unit 200 or image information received through a communication path.

The first printer unit 130 forms an image in accordance with, for example, the following processing. An image forming unit of the first printer unit 130 forms an electrostatic latent image on a photoconductive drum based on the image information. The image forming unit of the first printer unit 130 forms a visible image by adhering developer to the electrostatic latent image. Toner is used as a specific example of the developer. A transfer unit of the first printer unit 130 transfers a visible image onto a sheet. A fixing unit of the first printer unit 130 fixes the visible image onto the sheet by heating and pressurizing the sheet. A sheet on which an image is formed may be contained in the first sheet containing unit 140, may be contained in the second sheet containing unit 141, or may be inserted by hand. It is assumed that the first printer unit 130 performs image formation by using non-decolorable toner in the present embodiment. The decolorable toner is an aspect of a decolorable developer. The non-decolorable toner is an aspect of a non-decolorable developer.

The second printer unit 131 forms an image on a sheet, based on image information generated by the image reading unit 200 or image information received through a communication path. The second printer unit 131 forms an image by using the same processing as the first printer unit 130. A sheet on which an image is formed may be contained in the first sheet containing unit 140, may be contained in the second sheet containing unit 141, or may be inserted by hand. It is assumed that the second printer unit 131 performs image formation by using decolorable toner in the present embodiment.

The first sheet containing unit 140 contains a sheet which is used for image formation in the first printer unit 130 and the second printer unit 131. The second sheet containing unit 141 contains a sheet which is used for image formation in the first printer unit 130 and the second printer unit 131. The image forming apparatus 100 may include several sheet containing units.

The image reading unit 200 reads image information to be read as brightness and darkness of light. The image reading unit 200 records the read image information. The recorded image information may be transmitted to other information processing devices through a network. The recorded image information may be formed as an image on a sheet by the first printer unit 130 or the second printer unit 131.

Figure 2:
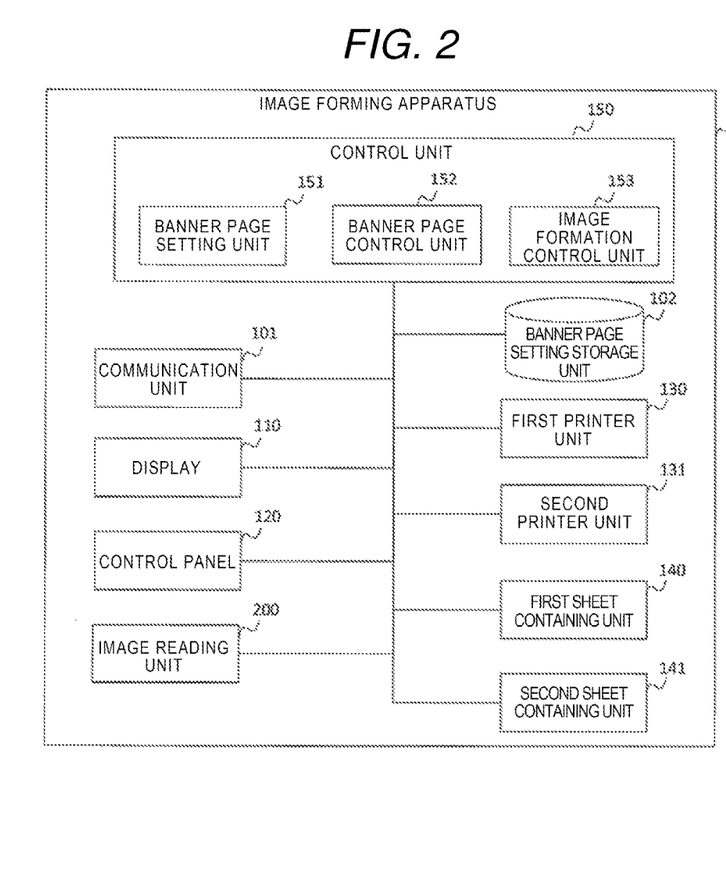
FIG. 2 is a functional block diagram illustrating a configuration of the image forming apparatus according to the embodiment.

FIG. 2 is a functional block diagram illustrating a configuration of the image forming apparatus 100 according to the embodiment. The image forming apparatus 100 includes a communication unit 101, a banner page setting storage unit 102, the display 110, the control panel 120, the first printer unit 130, the second printer unit 131, the first sheet containing unit 140, the second sheet containing unit 141, a control unit 150, and the image reading unit 200. Configurations of the display 110, the control panel 120, the first printer unit 130, the second printer unit 131, the first sheet containing unit 140, the second sheet containing unit 141, and the image reading unit 200 are the same as the aforementioned configuration, and thus, description thereof will be omitted.

The communication unit 101 is a network interface. The communication unit 101 is communicably connected to an information processing device such as a personal computer, or a server through a network. The communication unit 101 is connected by using a communication method such as the local area network (LAN) or public switched telephone networks (PSTN).

The banner page setting storage unit 102 is configured by using a storage device such as a magnetic hard disk device or a semiconductor memory device. The banner page setting storage unit 102 stores banner page setting information. The banner page setting information defines banner page setting conditions when image forming processing is performed. The banner page setting information is generated by a banner page setting unit 151. A banner page is a sheet which is used as a partition between one job and another job which instructs the image forming apparatus 100 to perform image forming processing. The banner page may be used as a partition for each copy if a plurality of copies of an image is generated. Images of a user's name, a job name, and printing date and time are formed in the banner page. Instead of the banner page, blank paper or colored paper may be used. The job is instruction for image formation accepted by the image forming apparatus 100. The job includes, for example, PRINT printing, COPY printing, and FAX reception printing. The PRINT printing is a job which is performed when image formation instruction is accepted from an external device. The COPY printing is a job which is performed when image formation instruction is accepted from the control panel 120. FAX reception printing is a job which is executed when FAX is received.

The control unit 150 controls operations of each unit of the image forming apparatus 100. The control unit 150 accepts the jobs through the communication unit 101 or the control panel 120. The control unit 150 is configured by a device including, for example, a central processing unit (CPU) and a random access memory (RAM). The control unit 150 functions as the banner page setting unit 151, a banner page control unit 152, and an image formation control unit 153 by executing an image forming apparatus control program.

The banner page setting unit 151 generates banner page setting information in accordance with an operation of a user. The banner page setting unit 151 stores the generated banner page setting information in the banner page setting storage unit 102. The banner page setting information defines by which one of non-decolorable toner and decolorable toner an image of the banner page is formed. In addition, the banner page setting information defines from which of the first sheet containing unit 140 or the second sheet containing unit 141 a sheet that is used for the banner page is acquired. Hereinafter, when it is not distinguished that which one of the first sheet containing unit 140 and the second sheet containing unit 141 is selected, description will be made by simply calling a "sheet containing unit". The banner page setting unit 151 may be included in an information processing device such as a personal computer and a tablet computer, as a printer driver.

The banner page control unit 152 outputs the banner page setting information to the image formation control unit 153. The banner page control unit 152 acquires the banner page setting information from the banner page setting storage unit 102. The banner page control unit 152 may acquire the banner page setting information from an external device. The external device is, for example, an information processing device, which is communicably connected to the communication unit 101, such as a personal computer and a server.

The image formation control unit 153 performs image forming processing by controlling the first printer unit 130 and the second printer unit 131. Hereinafter, when it is not distinguished that which one of the first printer unit 130 and the second printer unit 131 is selected, description will be made by simply calling a "printer unit".

The image formation control unit 153 forms an image of the banner page by the printer unit, based on the banner page setting information and the job. The image formation control unit 153 determines that which one of the first printer unit 130 and the second printer unit 131 forms an image of the banner page based on the banner page setting information. After the image of the banner page is formed, the printer unit forms an image of image data based on the job. If a plurality of jobs is accepted, the printer unit forms an image of the banner page each time the image of one job is formed. In addition, if images of a plurality of copies of the same image data are formed, the printer unit may form an image of the banner page each time the image of one copy of the image data is formed.

Figure 3:
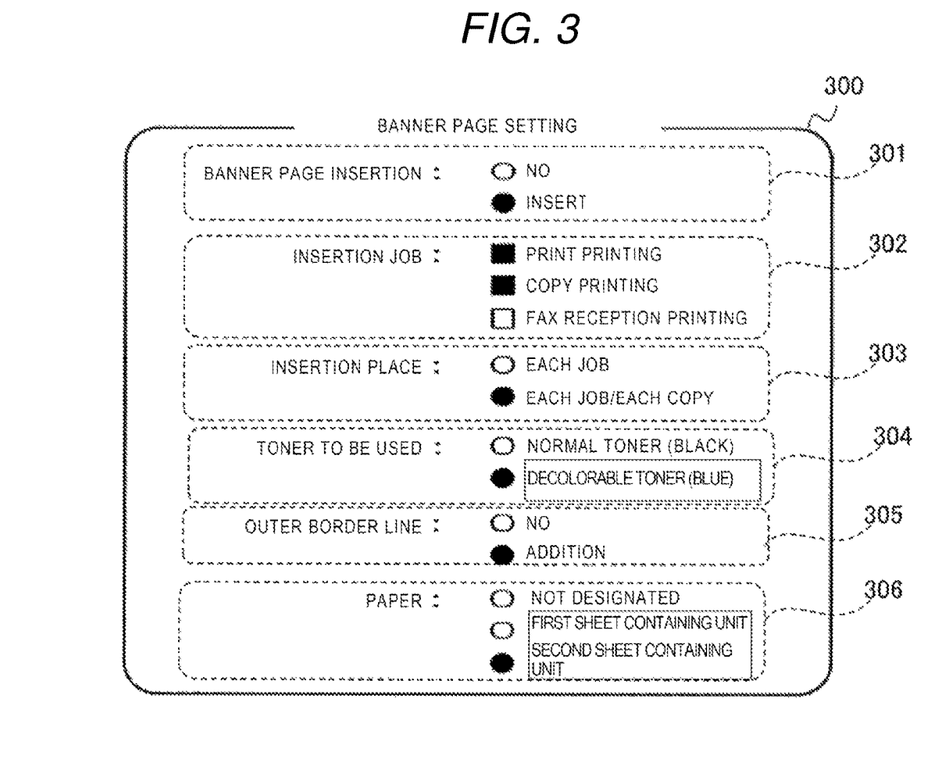
FIG. 3 is a diagram illustrating a setting screen of a banner page according to the embodiment.

FIG. 3 is a diagram illustrating a setting screen of the banner page according to the embodiment. The setting screen of the banner page is displayed on the display 110 by the banner page setting unit 151. A region 300 shows the entire banner page setting screen which is displayed on the display 110. The region 300 includes regions which accept inputs with respect to banner page insertion, an insertion job, an insertion place, toner to be used, an outer border line, and paper that are setting information of the banner page. The banner page setting unit 151 accepts the inputs through the control panel 120.

A region 301 is a region which determines whether or not an image of the banner page is formed. A user inputs any one of "no" and "insert" in the region 301 through the control panel 120. If "no" is input, the image of the banner page is not formed when image forming processing is performed. In contrast to this, if "insert" is input, the image of the banner page is formed when the image forming processing is performed.

A region 302 is a region where a job which forms the image of the banner page is determined. A user selects a job that the user wants to form the image of the banner page among the "PRINT printing", the "COPY printing", and the "FAX reception printing" from the region 302 through the control panel 120. The selection is performed by a checkbox. If the "PRINT printing" is selected, if a job which instructs image formation is accepted through the communication unit 101, the image of the banner page is formed. If the "COPY printing" is selected, the image of the banner page is formed when an image read by the image reading unit 200 is formed. If the "FAX reception printing" is selected, when the communication unit 101 receives FAX, the image of the banner page is formed. A plurality of the checkboxes may be selected. In addition, the region 302 is displayed on the display 110 only. That is, if a banner page setting screen is displayed on a display unit included in an information processing device, the banner page setting unit 151 included in a printer driver does not display the region 302.

A region 303 determines a place where the banner page is inserted. A user inputs any one of "each job" or "each job/each copy" to the region 303 through the control panel 120. If "each job" is input, the image of the banner page is formed each time image of one job is formed. In contrast to this, if "each job/each copy" is input, the image of the banner page is formed each time the image of one job is formed. Furthermore, if images of a plurality of copies of the same image data are formed, the image of the banner page is formed each time the image of one copy of the image data is formed.

A region 304 determines toner which is used by the printer unit when image of the banner page is formed. A user inputs any one of "normal toner (black)" and "decolorable toner (blue)" to the region 304 through the control panel 120. If the "normal toner (black)" is input, the image formation control unit 153 controls the first printer unit 130, and thereby, the image of the banner page is formed by non-decolorable toner. In contrast to this, if the "decolorable toner (blue)" is input, the image formation control unit 153 controls the second printer unit 131, and thereby, image of the banner page is formed by decolorable toner.

A region 305 determines whether or not image of an outer border line is formed in the banner page. The user inputs any one of "no" or "addition" to the region 305 through the control panel 120. If "no" is input, the image of the outer border line is not formed in the banner page. In contrast to this, if "addition" is input, the image of the outer border line is formed in the banner page.

A region 306 determines from which sheet containing unit a sheet on which an image of the banner page is formed is acquired. A user inputs any one of "no", the "first sheet containing unit", and the "second sheet containing unit" to the region 306 through the control panel 120. If "no" is input, the printer unit acquires a sheet from a predetermined sheet containing unit when an image of the banner page is formed. The predetermined sheet containing unit may be the same sheet containing unit as the sheet containing unit which is selected in, for example, image forming processing of a job, and may be randomly designated. If the "first sheet containing unit" is input, the printer unit acquires the sheet from the first sheet containing unit 140 when the image of the banner page is formed. If the "second sheet containing unit" is input, the printer unit acquires the sheet from the second sheet containing unit 141 when the image of the banner page is formed.

Figure 4:
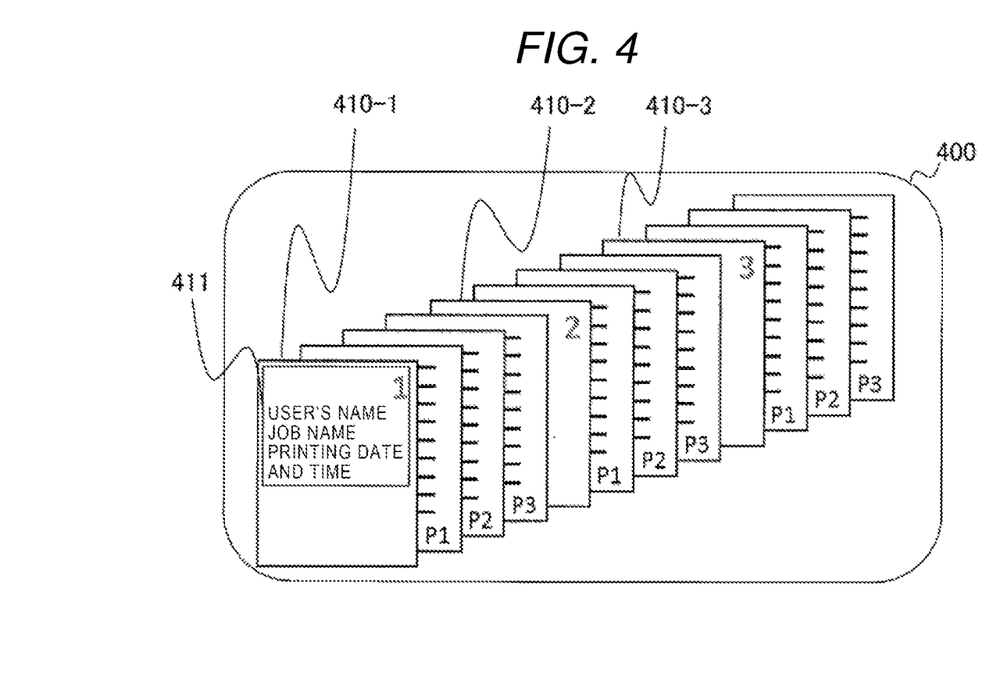
FIG. 4 is a diagram illustrating a first specific example if the image forming apparatus according to the embodiment inserts the banner page.

FIG. 4 is a diagram illustrating a first specific example if the image forming apparatus 100 according to the embodiment inserts the banner page. In the present embodiment, a job in which images of three sheets are formed by three copies will be described as an example. A region 400 shows the results of image forming processing when the job is executed. The region 400 includes a region 410-1 to a region 410-3, and a region 411. In the banner page setting information of the region 400, banner page insertion is "insert", an insertion job is "PRINT printing", an insertion place is "each copy", toner to be used is "decolorable toner (blue)", an outer border line is "no", and paper is "not designated". Hereinafter, when it is not distinguished that which one of the region 410-1 to the region 410-3 is selected, description will be made by simply calling a "region 410".

The region 410 shows one specific example of the banner page whose image is formed. The region 410 includes the region 411. Since each insertion unit in the banner page setting information is "each copy", an image of the banner page is formed by three copies. In addition, since the toner to be used is the "decolorable toner (blue)", the image of the banner page is formed by the decolorable toner. In addition, since the outer border line is "no", an image of the outer border line is not formed in the banner page. Since the paper is "not designated", the same sheet containing unit as the sheet containing unit which is selected in the image forming processing of the job is used.

The region 411 is one specific example of information on an image which is formed in the banner page. Images of a user's name, a job name, printing date and time, and a number are formed in the region 411. The user's name indicates an image of the name of the user that instructs a job. The user's name may be any types of information as long as it can identify a user, for example, an employee number, an account name, or the like. The job name indicates by which job of the "PRINT printing", the "COPY printing", and the "FAX reception printing" the image forming processing is performed. The printing date and time indicates date and time when the image forming apparatus 100 accepts a job. The date and time may be represented by a format of, for example, YYYY year, MM month, DD day, and may be represented by other formats. The number is a character which identifies the banner page. The numbers are allocated to the banner page in an ascending order from "1" for each job. Other characters may be used as the numbers, as long as the banner page is identified. For example, the alphabet may be used as the numbers.

Figure 5:
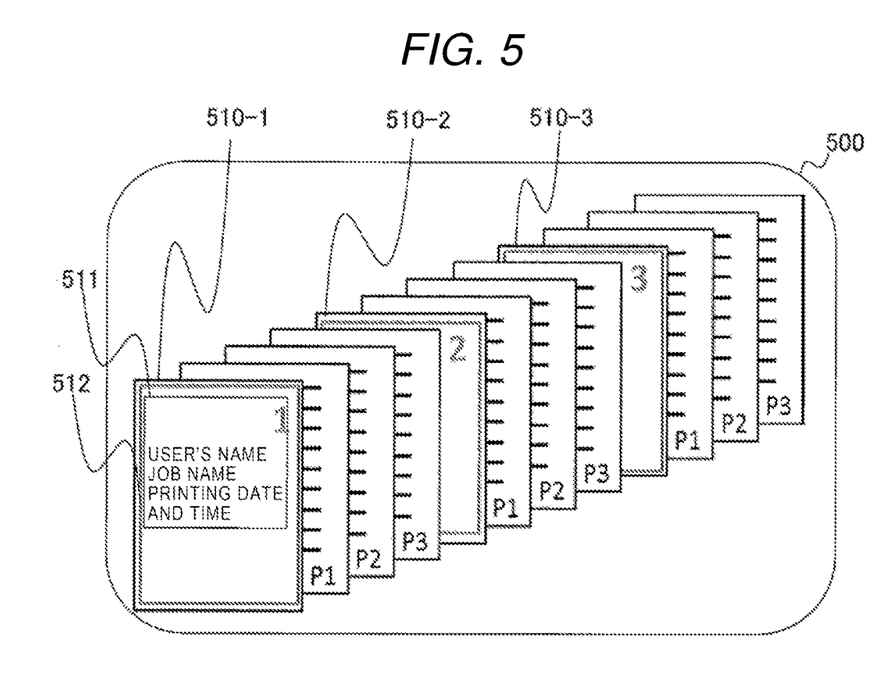
FIG. 5 is a diagram illustrating a second specific example if the image forming apparatus according to the embodiment inserts the banner page.

FIG. 5 is a diagram illustrating a second specific example if the image forming apparatus 100 according to the embodiment inserts the banner page. In the present embodiment, a job in which images of three sheets are formed by three copies will be described as an example. A region 500 shows the results of image forming processing when the job is executed. The region 500 includes a region 510, a region 511, and a region 512. In the banner page setting information of the region 500, banner page insertion is "insert", an insertion job is "PRINT printing", an insertion place is "each copy", toner to be used is "decolorable toner (blue)", an outer border line is "addition", and paper is "not designated". Since configurations of the region 510 and the region 511 are the same as above, description thereof will be omitted.

The region 512 is one specific example of the outer border line. If toner to be used is "decolorable toner (blue)", an image of the outer border line is formed by decolorable toner. In contrast to this, if the toner to be used is "normal toner (black)", the image of the outer border line is formed by non-decolorable toner. A banner page in which the image of the outer border line is formed is inserted into each job and each copy of the "PRINT printing", the "COPY printing", and the "FAX reception printing". Hence, a user can easily distinguish the banner page from a sheet other than the banner page, and sorting work and the like of the sheet after the image forming processing are efficient.

Figure 6:
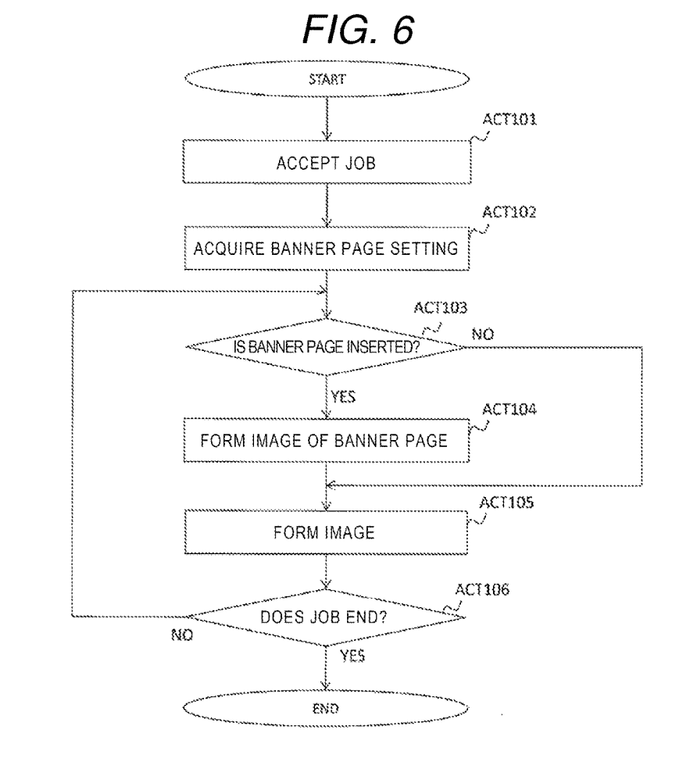
FIG. 6 is a flowchart illustrating a flow of image forming processing which is performed by the image forming apparatus according to the embodiment.

FIG. 6 is a flowchart illustrating a flow of the image forming processing which is performed by the image forming apparatus 100 according to the embodiment. The control unit 150 of the image forming apparatus 100 accepts a job which instructs image formation (ACT 101). The banner page control unit 152 of the image forming apparatus 100 acquires banner page setting information from the banner page setting storage unit 102 (ACT 102). The image formation control unit 153 of the image forming apparatus 100 determines whether or not to insert the banner page, based on the banner page setting information (ACT 103).

If the banner page is inserted (ACT 103: YES), the image formation control unit 153 forms an image of the banner page by the printer unit, based on the banner page setting information (ACT 104). If the banner page is not inserted (ACT 103: NO), the image formation control unit 153 does not form the image of the banner page by the printer unit.

The image formation control unit 153 performs the image forming processing, based on the accepted job (ACT 105). If the image forming processing ends, the image formation control unit 153 determines whether or not the job ends (ACT 106). If the job ends, the image formation control unit 153 ends processing. If the job does not end, the image formation control unit returns to ACT 103 and determines whether or not to insert the banner page, based on the banner page setting information (ACT 103). A case where the job does not end is a case where only one copy of the image is formed or the like, for example, in a case where two copies or more of the image are formed or the like.

Figure 7:
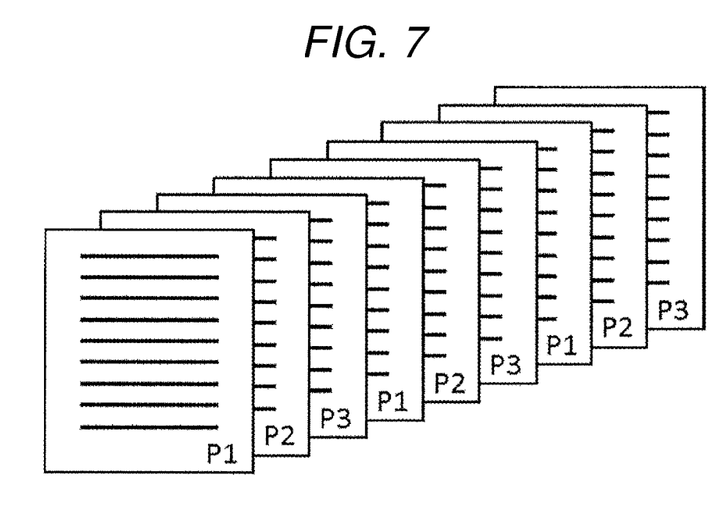
FIG. 7 is a diagram illustrating one specific example when an image is formed without a banner page of the related art.
Figure 8:
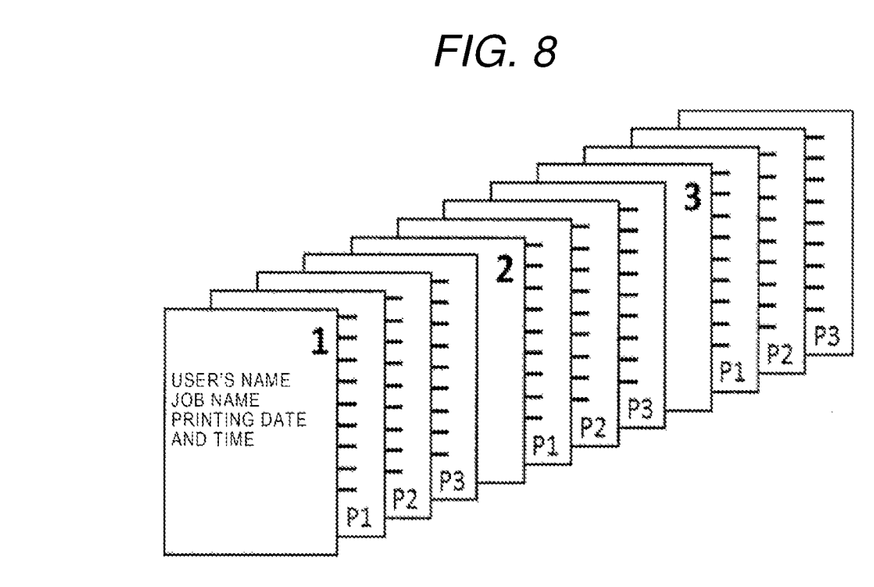
FIG. 8 is a diagram illustrating one specific example when an image of the banner page is formed by using non-decolorable toner.

FIG. 7 is a diagram illustrating one specific example when an image is formed without a banner page of the related art. Since an image of the banner page is not formed in FIG. 7, a user has to search for a boundary between each job or each copy, and thereby, it takes long time. In contrast to this, FIG. 8 is a diagram illustrating one specific example when an image of the banner page is formed by using non-decolorable toner. Since the image of the banner page is formed by non-decolorable toner in FIG. 8, the user can easily search for the boundary between each job or each copy. However, an image of information is formed in the banner page, and a sheet cannot be reused.

In contrast to this, in the image forming apparatus 100, the image of the banner page is formed by the decolorable toner, based on the banner page setting information which is stored in the banner page setting storage unit 102. Since the image of the banner page is formed by the decolorable toner, a user can decolor the used banner page. Image forming processing for the decolorized banner page can be performed again. Hence, the user can easily search for the boundary of each job or each copy, and can reuse a sheet which has not been reused so far.

Figure 9:
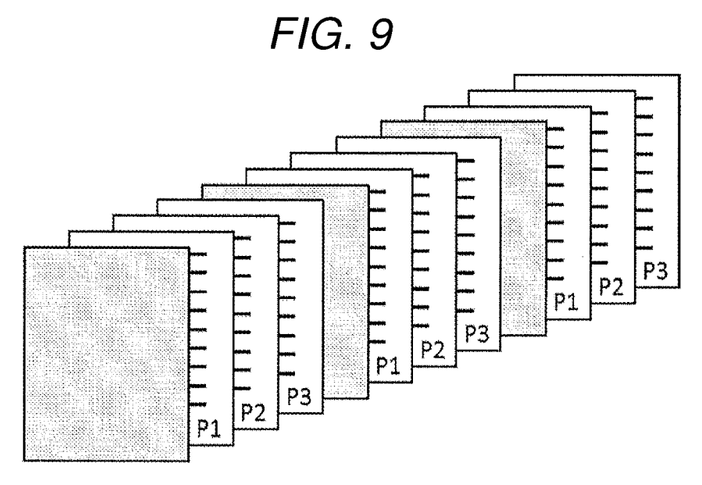
FIG. 9 is a diagram illustrating one specific example when an image is formed on a cover by using colored paper.

In addition, FIG. 9 is a diagram illustrating one specific example when an image is formed with a cover by using colored paper. Since a colored paper is used instead of the banner page in FIG. 9, the user can easily search for the boundary between each job or each copy. In addition, since an image is not formed on the colored paper, the colored paper can be reused. However, since the colored paper and the sheet are used separately, it is necessary to prepare different sheet containing units.

In contrast to this, in the image forming apparatus 100, the image of the banner page is formed by the decolorable toner. Accordingly, the user can decolor the used banner page. Since the decolorized banner page is in the same state as a blank sheet, the image forming processing can be performed again. Hence, it is unnecessary for the user to prepare a sheet containing unit dedicated to colored paper.

Furthermore, as the sheet containing unit is designated based on the banner page setting information, the user can use separately a normal sheet and a sheet for the banner page. The sheet for the banner page is, for example, a decolorized sheet after an image is formed by the decolorable toner. By configuring as such, the user can distinguish the banner page from other pages by using a decolorized sheet for the banner page and a normal sheet for other pages. Thereby, the normal sheet can be saved.

According to at least one embodiment described above, as the banner page control unit 152 is included, an image of the banner page can be formed by using the decolorable toner. Hence, it is possible to perform image formation of a reusable banner page.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a printer unit comprising a first printer component that performs image formation using non-decolorable toner and a second printer component that performs the image formation using decolorable toner, wherein the first printer component uses a first sheet drawn from a first sheet containing unit or a second sheet containing unit, and the second printer component uses a second sheet drawn from the first sheet containing unit or the second sheet containing unit; and
   a processor that executes instructions to perform operations, comprising:
   acquiring banner page setting information indicating setting conditions of a banner page which is inserted between one sheet and another sheet, on which an image is formed by a plurality of jobs;
   determining whether or not to form an image of the banner page by the printer unit, based on the banner page setting information;
   in response to determining that a first image is to be formed, determining, based on user input, to use decolorable toner and further determining to use the first sheet containing unit or the second sheet containing unit, and forming the image of the banner page using decolorable developer; and in response to determining that a second image is to be formed, determining, based on the user input, to use non-decolorable toner and further determining to use the first sheet containing unit or the second sheet containing unit, and forming the image of the banner page using non-decolorable developer.

2. The apparatus according to claim 1, wherein the banner page setting information includes information for determining whether or not to form the image of the banner page, in each of PRINT printing which is performed when an image formation instruction is accepted from an external device, COPY printing which is performed when the image formation instruction is accepted from a control panel that is included in the image forming apparatus, and FAX reception printing which is executed when FAX is received.

3. The apparatus according to claim 1, wherein the banner page setting information includes information for determining whether or not to form an image of an outer border in the banner page.

4. The apparatus according to claim 1, wherein the banner page setting information includes information for determining whether or not to form the image of the banner page each time an image of one copy of image data is formed, in response to the printer unit forming images of a plurality of copies of the same image data.

5. The apparatus according to claim 1, wherein the banner page setting information includes information for determining whether or not to select which sheet containing unit of a plurality of sheet containing units that is included in the image forming apparatus, in response to the printer unit performing image formation of a banner page.

6. An image forming method which is performed by an image forming apparatus comprising a printer unit comprising a first printer component that performs image formation using non-decolorable toner and a second printer component that performs the image formation using decolorable toner, wherein the first printer component uses a first sheet drawn from a first sheet containing unit or a second sheet containing unit, and the second printer component uses a second sheet drawn from the first sheet containing unit or the second sheet containing unit; the method, comprising:

banner page controlling, by a device comprising a processor, in which banner page setting information is acquired which indicates setting conditions of a banner page which is inserted between one sheet and another sheet, on which an image is formed by a different job;

image formation controlling, by the device, in which it is determined whether or not to form an image of the banner page by the printer unit, based on the banner page setting information;

in response to determining, by the device, that a first image is to be formed, determining, based on user input, to use decolorable toner and further determining to use the first sheet containing unit or the second sheet containing unit, and printing the image of the banner page using decolorable developer; and in response to determining, by the device, that a second image is to be formed, determining, based on the user input, to use non-decolorable toner and further determining to use the first sheet containing unit or the second sheet containing unit, and printing the image of the banner page using non-decolorable developer.

* * * * *